(12) United States Patent
Wagner et al.

(10) Patent No.: US 11,780,363 B2
(45) Date of Patent: Oct. 10, 2023

(54) MOTOR VEHICLE

(71) Applicant: ZKW Group GmbH, Wieselburg (AT)

(72) Inventors: Florian Wagner, Winklarn (AT); Stefan Mitterlehner, Mank (AT); Michael Brunner, Pöggstall (AT); Michael Salzer, Wolfpassing (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/908,161

(22) PCT Filed: Feb. 10, 2021

(86) PCT No.: PCT/EP2021/053175
§ 371 (c)(1),
(2) Date: Aug. 30, 2022

(87) PCT Pub. No.: WO2021/180408
PCT Pub. Date: Sep. 16, 2021

(65) Prior Publication Data
US 2023/0150425 A1    May 18, 2023

(30) Foreign Application Priority Data
Mar. 12, 2020  (EP) ........................ 20162618

(51) Int. Cl.
*B60Q 1/50*  (2006.01)
*B60Q 1/26*  (2006.01)
(Continued)

(52) U.S. Cl.
CPC .............. *B60Q 1/507* (2022.05); *B60Q 1/2611* (2013.01); *B60Q 1/5035* (2022.05);
(Continued)

(58) Field of Classification Search
CPC ................... B60Q 1/26-2653; B60Q 1/50-535; F21S 43/14-27
See application file for complete search history.

(56) References Cited

U.S. PATENT DOCUMENTS 10,112,528 B1   10/2018  Mazuir et al.
2004/0257790 A1  12/2004 Tanaka et al.
(Continued)

FOREIGN PATENT DOCUMENTS

DE     202015004772 U1  10/2015
DE     202017105259 U1   9/2017
(Continued)

OTHER PUBLICATIONS

International Search Report for PCT/EP2021/053175, dated Mar. 23, 2021 (13 pages).
(Continued)

*Primary Examiner* — Jason M Han
(74) *Attorney, Agent, or Firm* — Eversheds Sutherland (US) LLP

(57) ABSTRACT

A motor vehicle (10), which can be operated in a self-driving mode, wherein the motor vehicle includes an illumination system (50) for generating light signal messages to individual road users, which includes a lighting device (100) and a control device, wherein the lighting device (100) includes
at least one light source (110), includes
an optical diffuser (120), which is equipped to diffuse by diffraction the light that can be emitted from the light source (110) in order to make possible a diffuse light impression of the optical diffuser (120),
a carrier element (130), on which the light source (110) is arranged, wherein the carrier element (130) includes a cable conduit (140) for conducting an electrical line
(Continued)

Figure 1:
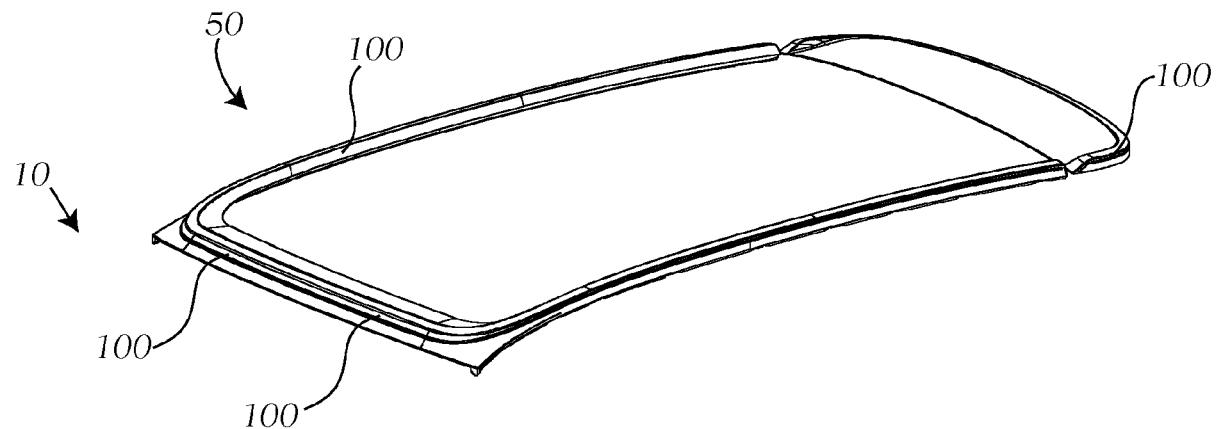

and a first fastening means (150) for fastening the carrier element (130) to the motor vehicle, includes a cover (160), which by means of a second fastening means (170) can be fastened to the carrier element (130), wherein the cover (160) combined with the carrier element (130) is equipped to hold the optical diffuser (120), and wherein the lighting device (100) is arranged encircling the motor vehicle in such a manner that when the one lighting device (100) is switched on, the optical diffuser (120) is perceptible as visually continuously shining light ring.

12 Claims, 2 Drawing Sheets

(51) Int. Cl.
    *F21S 43/27*     (2018.01)
    *F21S 43/15*     (2018.01)
    *F21S 43/19*     (2018.01)
    *F21S 43/237*     (2018.01)
    *F21S 43/20*     (2018.01)
    *F21S 43/14*     (2018.01)

(52) U.S. Cl.
    CPC ................ *B60Q 1/525* (2013.01); *F21S 43/14* (2018.01); *F21S 43/15* (2018.01); *F21S 43/195* (2018.01); *F21S 43/237* (2018.01); *F21S 43/26* (2018.01); *F21S 43/27* (2018.01)

(56) References Cited

U.S. PATENT DOCUMENTS

| | | |
|---|---|---|
| 2016/0258591 A1 | 9/2016 | Salter et al. |
| 2018/0172239 A1 | 6/2018 | Wacker et al. |
| 2018/0304801 A1 | 10/2018 | Salter et al. |

FOREIGN PATENT DOCUMENTS

| | | |
|---|---|---|
| EP | 3357754 A1 | 8/2018 |
| WO | 2017079349 A1 | 5/2017 |
| WO | 2019035433 A1 | 2/2019 |

OTHER PUBLICATIONS

Search Report for European Patent Application No. 20162618.1 dated May 29, 2020 (10 pages).

ABSTRACT
MOTOR VEHICLE

The invention relates to a motor vehicle which can be operated in a self-driving mode, wherein the motor vehicle includes an adaptive illumination system for generating adaptive light signal messages to individual road users, which illumination system includes at least one lighting device and a control device for controlling the at least one lighting device.

Communication between other road users and vehicles steered by humans always takes place by way of eye contact, gestures or visual/auditory (warning) signals such as flashing lights or horn.

The illumination functions of vehicles as safety-relevant measures and as means of communication for communicating with other road users will increasingly gain importance when vehicles are no longer steered by a human but act completely autonomously or partly autonomously for example via an autonomous self-driving mode relieving the driver. The illumination functions will then no longer orient themselves by the perception of the human road users, but by the requirements for technical installations (sensors, camera systems, etc.) of the self-driving vehicle. These technical installations can in a desirable manner reliably detect surrounding conditions present so that based on the detected situation, in particular a hazard situation, corresponding communication signals are transmitted to the other road users such as pedestrians, cyclists and non-autonomous vehicles. A particular challenge with respect to the use of autonomous vehicles is also constituted by road users which do not actively concentrate on the traffic or incorrectly assess a traffic situation, for example pedestrians and children. These road users can easily overlook vehicles or their illumination functions.

The term "self-driving vehicle" (herein also referred to as "autonomous vehicle" relates to vehicles, in particular to motor vehicles, which are equipped to be moveable even without intervention of a driver, typically in a computer-controlled manner. The self-driving vehicle can be for example completely autonomous or it can be a vehicle that can be switched over from an active driver-operated driving mode for relieving the driver into an autonomous self-driving mode. The self-driving vehicle can be of the single-track or double-track type. For example, this can be a passenger motor vehicle, a commercial vehicle or an agricultural vehicle such as a tractor or the like. In particular, the self-driving vehicle is a passenger car or a commercial vehicle.

The term "road user" relates to all objects. Typically present in road traffic, such as other vehicles and human road users such as pedestrians or cyclists.

It is an object of the invention to provide an improved motor vehicle.

This object is solved in that the at least one illumination device includes at least one light source,
at least one optical diffuser assigned to the light source, which is equipped to diffuse the light that can be emitted by the at least one light source by way of diffraction in order to make possible a diffuse illumination impression of the optical diffuser,
a carrier element, on which the at least one light source is arranged, wherein the carrier element includes a cable conduit for conducting at least one electrical line, which connects the at least one light source with the control device, and a first fastening means for fastening the carrier element or the lighting device to the motor vehicle,
a cover, which can be fastened to the carrier element by means of a second fastening means, wherein the cover, combined with the carrier element in a state as fastened to the carrier element is equipped to hold the optical diffuser, and wherein the at least one lighting device is arranged encircling the motor vehicle in such a manner that when the at least one lighting device is switched on, the optical diffuser is perceptible as visually continuously shining light ring.

It can be provided that the lighting device is arranged horizontally encircling the motor vehicle.

The term "horizontally encircling" is to mean to that the at least one lighting device extends over the two longitudinal sides and also the two wide sides of the motor vehicle, for example along the roof rail. Here, the at least one lighting device need not be oriented exactly horizontally to the respective road surface on which the vehicle is located (during the operation), but can also have steps for the connection of which in turn a portion of the at least one lighting device runs at an angle to the road surface or no longer horizontally.

"Horizontally encircling" does not mean that the at least one lighting device runs over the floor plate and over the roof of the motor vehicle, which would correspond to a vertically encircling arrangement.

The at least one lighting device can be for example a part of the body of the motor vehicle, for example as replacement for ornamental mouldings which are usually present on the vehicle doors below the windows or the roof rail of the motor vehicle.

The at least one lighting device and the control device can be operated by way of the already existing motor vehicle electrical system.

It can be provided that the carrier element has a longitudinal extension wherein the cable conduit extends along the longitudinal extension of the carrier element.

It can be provided that the illumination system includes at least two or more lighting devices, wherein the at least two or more lighting devices are arranged encircling the motor vehicle in such a manner that with each lighting device switched on simultaneously, the optical diffusers of the lighting devices are perceptible as visually continuously shining light ring.

In the presence of two or more lighting devices, the lighting devices can be physically spaced apart from one another for as long as, when each light source, for example light emitting diode (LED) is switched on, they form a visually continuously shining light ring.

In this context, "continuous" is to mean that a closed light ring is formed, i.e. that in the switched-on state of the light sources, the light ring appears or is perceptible visually continuously or closed continuously about the motor vehicle. Here, the lighting devices can physically be spaced apart as mentioned above. It can also be provided that the lighting devices physically also form a continuous or closed light ring.

With two or more lighting devices, these can be arranged relative to one another or on one another in such a manner that the cable conduit of a lighting device follows the cable conduit of the immediately adjacent lighting device so that a continuous cable conduit is made possible.

It can be provided that the at least one light source is formed as LED.

It can be provided that the at least one LED is arranged on a circuit board, which circuit board is arranged on the carrier element.

It can be provided that the at least one light source is formed as a light guide with an LED into which light guide light of the LED can be fed.

It can be provided that the first fastening means includes screws and associated bore openings, wherein the bore openings are arranged on the carrier element, via which bore openings the carrier element can be fastened to the motor vehicle by means of the screws.

It can be provided that the second fastening means includes screws and associated bore openings, wherein the bore openings are arranged on the carrier element, via which bore openings the cover can be fastened to the carrier element by means of the screws.

It can be provided that the at least one light source of the at least one lighting device are controlled and activated by the control device when the motor vehicle is in the self-driving mode.

It can be provided that the at least two or more lighting devices can be controlled by the control device independently of one another.

It can be provided that the motor vehicle includes at least one sensor device which is equipped in each case to individually detect road users that are present in the vicinity of the motor vehicle and take into account changes of the relative position between the motor vehicle and the individual road users.

It can be provided that the at least one sensor device is an image sensor-supported camera, a near field infrared sensor or an ultrasound sensor.

The at least one sensor device for individually detecting other road users present in the vehicle vicinity can be realised for example as image sensor-supported camera, infrared sensor and/or radar scanner. In addition to this, LiDAR or ultrasound systems can also be employed. Such devices are known from the state of the art and can also be employed combined with one another in order to utilise the various advantages. The image sensor-supported camera can include the functions of a normal camera, a night-vision camera and/or a fog-vision camera, so that in any light conditions and weather a reliable and detection of the vehicle surroundings and of the road users involved of adequate quality is possible. It can be provided that the camera has an additional infrared camera function in order to be able to even better detect humans and animals on the basis of their body temperature.

It can be provided that the sensor device on detecting at least one road user transmits a signal to the control device so that the control device controls that lighting device which is closest to the at least one detected road user.

It can be provided that the controlled light sources radiate a coloured light, for example green and/or red light.

It can be further provided that the light colour of the light distribution generated by the light sources, which is transmitted to the respective detected road user, informs the road user as to how the traffic situation is evaluated by the self-driving vehicle. Conveniently, colours can be employed here which have become accepted in road traffic as generally recognised signals for certain situations. For example, the colour "green" could signal to the road user that he has been detected by the self-driving vehicle, the situation thus is in the "green range" and the road user need not take any actions. The colours "yellow" or "orange" could signal to the road user that the traffic situation does not pose any danger as yet but that any action of the road user (e.g. standing still, braking) is anticipated. The colour "red" could signal a hazard situation which requires actions both on the part of the road user and also on the part of the self-driving vehicle in order to prevent a potentially dangerous traffic situation or an accident.

It can be provided that the respective detected road user is made aware of the self-driving vehicle by means of an intensity modulation of the generated signal light distribution. The intensity modulation can include flashing, strobe flashing, a constant brightness with superimposed strobe flashes or a combination thereof. The intensity modulation of the generated signal light distribution represents an efficient measure in order to be able to avert concrete and immediate dangers.

It can also be provided that the light ring can be utilised in order to indicate travelling directions. For example, a wipe effect in the case of an intended forward or reverse movement of the vehicle can be generated with the help of the lighting devices of the light ring. In the following, the invention is explained in more detail by way of exemplary drawings. Here it shows FIG. 1 an extract of an exemplary motor vehicle having an illumination system which comprises multiple lighting devices which are arranged on the motor vehicle in a horizontally encircling manner, FIG. 2 an exemplary lighting device in a perspective view, FIG. 3 the exemplary lighting device from FIG. 2 in a perspective view from below, FIG. 4A a schematic cross-section of an exemplary lighting device on a motor vehicle, FIG. 4B a schematic cross-section of a further exemplary lighting device on a motor vehicle, FIG. 4C a schematic cross-section of a further exemplary lighting device on a motor vehicle, FIG. 4D a schematic cross-section of a further exemplary lighting device on a motor vehicle, and FIG. 4E a schematic cross-section of a further exemplary lighting device on a motor vehicle.

FIG. 1 shows an exemplary motor vehicle 10, which can be operated in a self-driving mode, wherein the motor vehicle 10 includes an adaptive illumination system 50 for generating adaptive light signal messages to individual road users, which illumination system 50 includes multiple lighting devices 100 and a control device for controlling the lighting devices 100. The lighting devices 100 are arranged horizontally encircling the motor vehicle 10 in such a manner that when each lighting device 100 is switched on simultaneously, the optical diffuser 120 of the lighting devices 100 are perceptible as visually continuously shining light ring.

The illumination system 50 of the exemplary motor vehicle 10 is configured so that the light source 110 of the lighting devices 100 are controlled and activated by the control device when the motor vehicle is in the self-driving mode. Further, the lighting devices 100 can be controlled by the control device independently of one another.

Further, the motor vehicle 10 can include at least one sensor device which is equipped in each case to individually detect road users present in the vicinity of the motor vehicle 10 and take into account changes of the relative position between the motor vehicle 10 and the individual road users. Here, the sensor device can be an image sensor-supported camera, a nearfield infrared sensor or an ultrasound sensor. On detecting at least one road user, the sensor device can transmit a signal to the control device so that the control device controls that lighting device or those lighting devices 100 which is/are nearest to the at least one detected road user.

Figure 2:
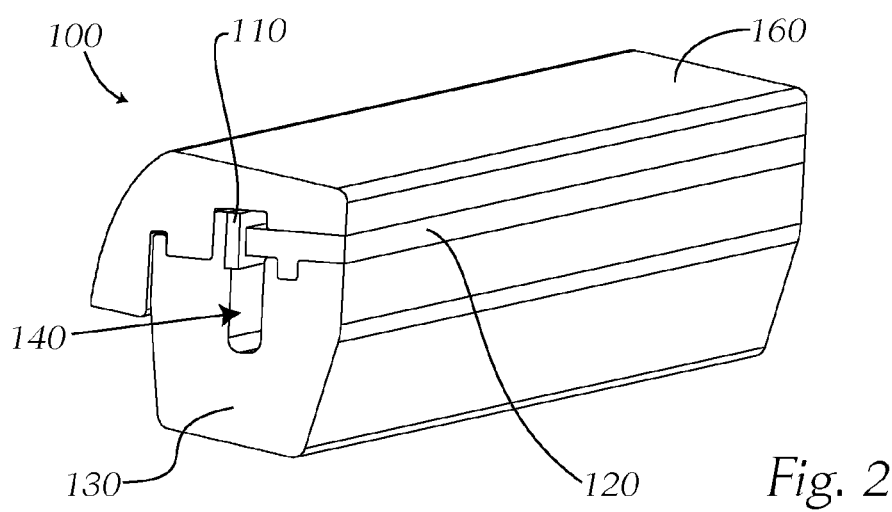

A detailed view of an exemplary lighting device 100 is shown in FIG. 2, wherein the lighting device 100 includes a light source 110, which can be formed as LED or multiple LEDs on a circuit board or an LED with a light guide.

Further, the lighting device 100 includes an optical diffuser 120 assigned to the light source 110 which is equipped to diffuse by diffraction the light that can be emitted by the at least one light source 110 in order to make possible a diffuse light impression of the optical diffuser 120.

In addition to this, the lighting device includes a carrier element 130 on which the light source 110 is arranged, wherein the carrier element 130 includes a cable conduit 140 for conducting at least one electrical line, which connects the light source 110 with the control device, and a first fastening means 150 for fastening the carrier element 130 or the lighting device 100 to the motor vehicle. In the shown example, the first fastening means 150 includes screws and associated bore openings 151, wherein the bore openings 151 are arranged on the carrier element 130, via which bore openings 151 the carrier element 130 can be fastened to the motor vehicle by means of the screws, wherein the first fastening means 150 or the bore openings 151 are visible in FIG. 3.

The lighting device 100 further includes a cover 160 which can be fastened to the carrier element 130 by means of a second fastening means 170, wherein the cover 160 combined with the carrier element 130 is equipped in a state as fastened to the carrier element 130 to hold the optical diffuser 120.

Figure 3:
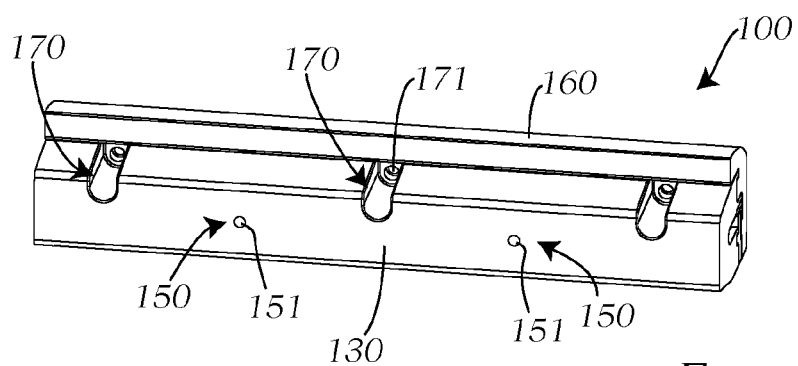

The second fastening means 170 includes screws and associated bore openings 171, wherein the bore openings 171 are arranged on the carrier element 130 via which bore openings 171 the cover 160 can be fastened to the carrier element 130 by means of the screws, wherein the second fastening means 170 or the bore openings are visible in FIG. 3.

Figure 4A:
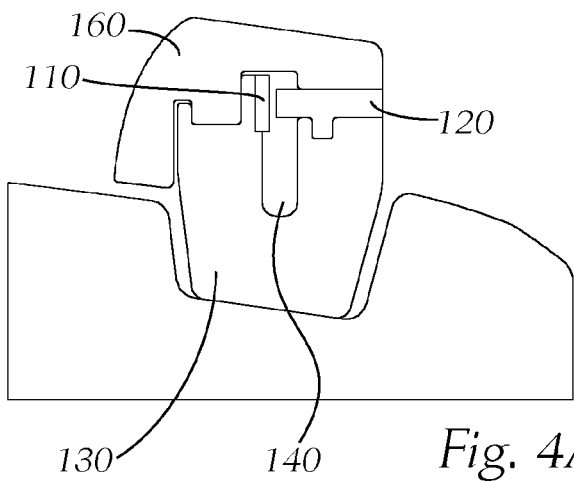
Figure 4B:
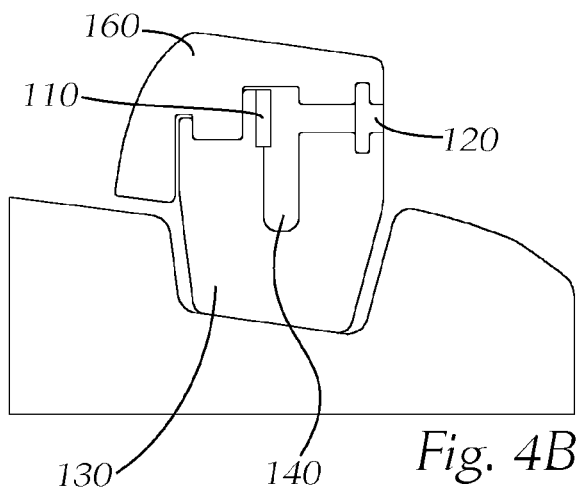
Figure 4C:
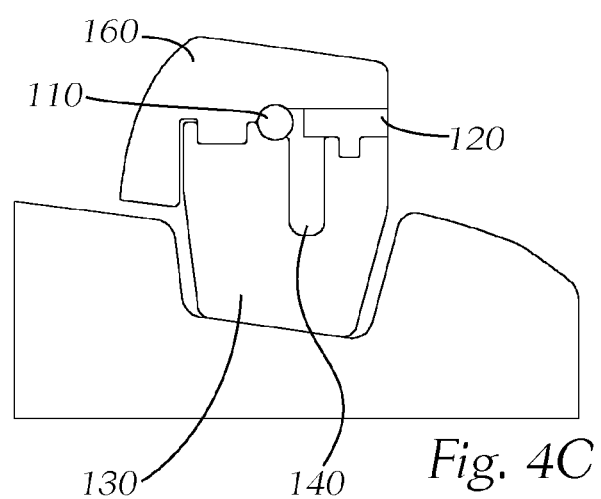
Figure 4D:
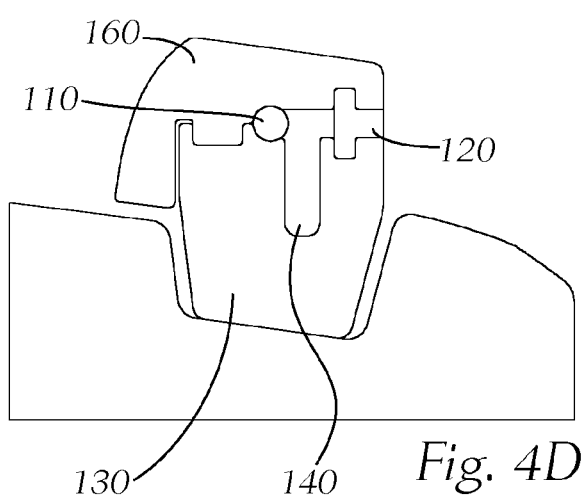
Figure 4E:
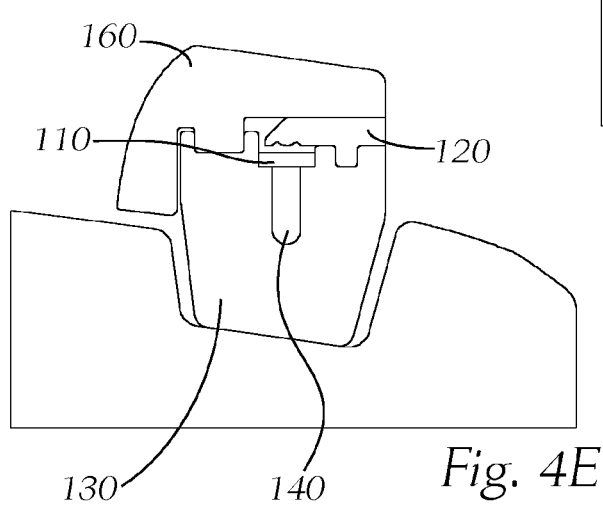

FIGS. 4A, 4B, 4C, 4D and 4E additionally show further exemplary embodiments of a lighting device 100 in a schematic cross-sectional view. In FIGS. 4A, 4B and 4E, the light sources are designed as LED on a circuit board, wherein in FIG. 4E the optical diffuser 120 additionally comprises an optical coupling unit for the light that can be emitted from the light source, which optical coupling-in unit can be designed for example as collimator, wherein the light coupled into the collimator is decoupled from the optical diffuser by way of a deflection region of the optical diffuser. The LED or the circuit board with the LED/LEDs is arranged in such a manner that the main radiation direction of the imitable light is directed in the direction of the cover or in a properly fastened state of the lighting device on a motor vehicle, towards the top.

"Main radiation direction" is to mean the direction in which the light emitting diode or the light emitting diodes as a consequence of their directional action radiates/radiate the brightest or the most light.

FIGS. 4C and 4D show exemplary embodiments of a lighting device, in which the light sources are formed as light guides with at least one LED, into which light guide light of the at least one LED can be fed.

The invention claimed is:

1. A motor vehicle (10), which can be operated in a self-driving mode, wherein the motor vehicle includes an adaptive illumination system (50) for generating adaptive light signal messages to individual road users, which illumination system (50) includes at least one lighting device (100) and a control device for controlling the at least one lighting device (100), wherein the at least one lighting device (100) comprises:
at least one light source (110);
at least one optical diffuser (120) assigned to the light source (110), which is configured to diffuse by diffraction light emitted by the at least one light source (110) in order to make possible a diffuse light impression of the optical diffuser (120);
a carrier element (130), on which the at least one light source (110) is arranged, wherein the carrier element (130) includes a cable conduit (140) for conducting at least one electrical line which connects the at least one light source (110) with the control device, and a first fastening means (150) for fastening the carrier element (130) or the lighting device (100) to the motor vehicle; and
a cover (160), which can be fastened to the carrier element (130) by means of a second fastening means (170), wherein the cover (160) combined with the carrier element (130) in a state as fastened to the carrier element (130) is configured to hold the optical diffuser (120),
wherein the at least one lighting device (100) is arranged encircling the motor vehicle in such a manner that when the at least one lighting device (100) is switched on, the optical diffuser (120) is perceptible as a visually continuously shining light ring.

2. The motor vehicle according to claim 1, wherein the illumination system (50) includes at least two or more lighting devices (100), wherein the at least two or more lighting devices (100) are arranged encircling the motor vehicle in such a manner that when each lighting device (100) is switched on simultaneously, the optical diffusers (120) of the lighting devices (100) are perceptible as visually continuously shining light ring.

3. The motor vehicle according to claim 1, wherein the at least one light source (110) comprises at least one LED.

4. The motor vehicle according to claim 3, wherein the at least one LED is arranged on a circuit board, which circuit board is arranged on the carrier element (130).

5. The motor vehicle according to claim 1, wherein the at least one light source (110) comprises a light guide with an LED, into which light guide light of the LED can be fed.

6. The motor vehicle according to claim 1, wherein the first fastening means (150) includes screws and associated bore openings (151), wherein the bore openings (151) are arranged on the carrier element (130), via which bore openings (151) the carrier element (130) can be fastened to the motor vehicle by means of the screws.

7. The motor vehicle according to claim 1, wherein the second fastening means (170) includes screws and associated bore openings (171), wherein the bore openings (171) are arranged on the carrier element (130), via which bore openings (171) the cover (160) can be fastened to the carrier element (130) by means of the screws.

8. The motor vehicle according to claim 1, wherein the at least one light source (110) of the at least one lighting device (100) is controlled and activated by the control device when the motor vehicle is in the self-driving mode.

9. The motor vehicle according to claim 2, wherein the at least two or more lighting devices (100) can be controlled by the control device independently of one another.

10. The motor vehicle according to claim 1, wherein the motor vehicle includes at least one sensor device which is equipped to individually detect in each case road users present in the vicinity of the motor vehicle and take into account changes of the relative position between the motor vehicle and the individual road users.

11. The motor vehicle according to claim 10, wherein the at least one sensor device is an image sensor-supported camera, a nearfield infrared sensor or an ultrasound sensor.

12. The motor vehicle according to claim 10, wherein the at least one sensor device, upon detecting at least one road user, transmits a signal to the control device so that the control device controls that lighting device (100) which is nearest to the at least one detected road user.

\* \* \* \* \*